Patented May 25, 1926.

1,586,013

UNITED STATES PATENT OFFICE.

HERMANN STAUDINGER, OF ZURICH, ROBERT STOCKER, RICHARD TOBLER, AND ARMIN BUCHER, OF BASEL, AND JAKOB MUELLER, OF MUNCHENSTEIN, NEAR BASEL, SWITZERLAND, ASSIGNORS TO SOCIETY OF CHEMICAL INDUSTRY IN BASLE, OF BASEL, SWITZERLAND.

THIONAPHTHISATINS AND THE PROCESS OF MAKING SAME.

No Drawing.    Application filed November 23, 1923.  Serial No. 676,640.

This invention relates to new intermediate products for the manufacture of dyestuffs.

It has been found that new valuable intermediate products are obtained by condensing those thionaphthols which have no free α-position in ortho-position to the SH-group with oxalyl chloride. The new products are thionaphthisatins, characterized by the atom grouping

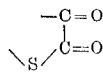

being attached to two carbon atoms of the naphthalene neucleus in ortho-position to each other. They form red crystalline powders which dissolve in organic solvents with reddish yellow color.

Example 1.

160 parts of α-thionaphthol are introduced into 635 parts of oxalyl chloride. The mixture is thoroughly stirred for some time at the ordinary temperature and then heated gradually to the boiling point of oxalyl chloride so that this latter is distilled. The residue is well heated for some hours at a raised temperature and the 1:2-thionaphthisatin produced is extracted by means of an aqueous solution of sodium carbonate and then precipitated from the solution by means of hydrochloric acid. Its melting point is 168° C. The formula of the new product is most probably

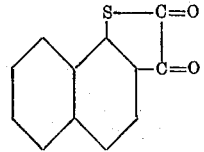

Example 2.

239 parts of 1-bromo-2-thionaphthol are introduced, while stirring at 0°–10° C. into about 600 parts of oxalyl chloride. The mixture is stirred for 20 hours at the ordinary temperature. The excess of oxalyl chloride is distilled and the residue, after adding 1000 parts of carbon bisulphide is mixed, while stirring, and in the course of an hour with 250 parts of aluminium chloride, the temperature being maintained at 0°–10° C. Stirring is now continued for some time at ordinary temperature and then the temperature is gradually raised to the boiling point of carbon bisulphide, at which it is kept for one hour. The mixture is then introduced into water containing hydrochloric acid. After separating the carbon bisulphide the mixture is filtered and the solid matter extracted with dilute sodium carbonate solution at 50–60° C. Addition of hydrochloric acid to the sodium carbonate solution precipitates 1-bromo-2:3-thionaphthisatin which melts at 216–216.5° C. The formula of the new product is most probably

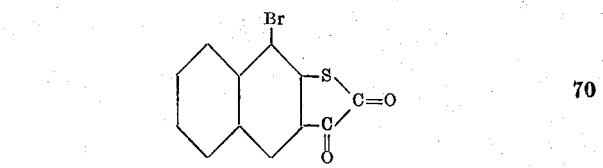

The 1-bromo-2-thionaphthol used as parent material form white needles and melts at 52° C.

In like manner other halogenized thionaphthisatins are obtained. For instance from 1-chloro-2-thionaphthol (melting point 51° C.) the 1-chloro-2:3-thionaphthisatin (melting point 194° C.).

From 4-chloro-1-thionaphthol (melting point 49–50° C.) the 4-chlora-1:2-thionaphthisatin (melting point 220° C.).

From 8-chloro-1-thionaphthol (melting point 108–109° C.) the 8-chloro-1:2-thionaphthisatin (melting point 238–239° C.).

What we claim is:

1. As new products the thionaphthisatins, whose characteristic atom grouping

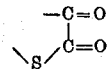

being attached to two carbon atoms of the naphthalene nucleus situated in ortho-position to each other and in which the

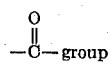

attached to the naphthalene nucleus is linked to this latter by a β-carbon atom, which products form red crystalline powders which dissolve in organic solvents with reddish yellow color.

2. As new products the halogen-substitution products of the thionaphthisatins, whose characteristic atom grouping

being attached to two carbon atoms of the naphthalene nucleus situated in ortho-position to each other and in which the

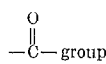 group attached to the naphthalene nucleus is linked to this latter by a β-carbon atom, which products form red crystalline powders which dissolve in organic solvents with reddish yellow color.

3. As new products the halogen-substitution products of the β-β-thionaphthisatins, whose characteristic atom grouping

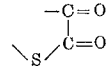

being attached to two β-positions of the naphthalene nucleus situated in ortho-position to each other, which products form red crystalline powders which dissolve in organic solvents with reddish yellow color.

In witness whereof we have hereunto signed our names this 3rd day of November 1923.

HERMANN STAUDINGER.
ROBERT STOCKER.
RICHARD TOBLER.
ARMIN BUCHER.
JAKOB MUELLER.